(12) United States Patent
Kim

(10) Patent No.: US 11,695,146 B2
(45) Date of Patent: Jul. 4, 2023

(54) AIR SUPPLY SYSTEM FOR FUEL CELL AND METHOD OF CONTROLLING SAME

(71) Applicants: HYUNDAI MOTOR COMPANY, Seoul (KR); KIA CORPORATION, Seoul (KR)

(72) Inventor: Young Min Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/873,289

(22) Filed: Jul. 26, 2022

(65) Prior Publication Data

US 2022/0359898 A1 Nov. 10, 2022

Related U.S. Application Data

(62) Division of application No. 17/029,344, filed on Sep. 23, 2020, now Pat. No. 11,431,013.

(30) Foreign Application Priority Data

May 19, 2020 (KR) .......................... 10-2020-0059860

(51) Int. Cl.
*H01M 8/0662* (2016.01)
*H01M 8/04089* (2016.01)
(Continued)

(52) U.S. Cl.
CPC ...... *H01M 8/0662* (2013.01); *B01D 53/0407* (2013.01); *B01D 53/8671* (2013.01);
(Continued)

(58) Field of Classification Search
CPC ........... H01M 8/0662; H01M 8/04097; H01M 8/04888; H01M 8/04753; H01M 8/04611; H01M 8/04798; H01M 8/04302; H01M 8/04303; H01M 8/04228; H01M 8/04619; H01M 8/04225; H01M 8/04805; H01M 8/04231; H01M 8/04216; H01M 8/0447; H01M 8/0687; H01M 2250/20;
(Continued)

(56) References Cited

U.S. PATENT DOCUMENTS

| 5,725,795 A | 3/1998 | Kashiba | |
|---|---|---|---|
| 2012/0077096 A1* | 3/2012 | Krause | H01M 8/04156 429/429 |
| 2018/0254499 A1* | 9/2018 | Kumar | H01M 8/04216 |

FOREIGN PATENT DOCUMENTS

KR 101875657 B1 7/2018

* cited by examiner

*Primary Examiner* — Matthew W Van Oudenaren
(74) *Attorney, Agent, or Firm* — Lempia Summerfield Katz LLC

(57) ABSTRACT

Disclosed is a method of controlling an air supply system for a fuel cell. The air supply system includes a fuel cell stack, an air channel to supply air to an inlet of the fuel cell stack, a gas adsorption unit disposed on the air channel and configured to adsorb oxygen contained in air introduced into the air channel. In particular, the method includes: determining whether a power generation operation of the fuel cell stack is resumed; when the power generation operation of the fuel cell stack is resumed, controlling a voltage source to apply a voltage to the gas adsorption unit; and supplying air to the fuel cell stack through the air channel in a state in which the voltage is applied to the gas adsorption unit.

5 Claims, 6 Drawing Sheets

(51) Int. Cl.

| | |
|---|---|
| *H01M 8/04858* | (2016.01) |
| *H01M 8/04746* | (2016.01) |
| *B01D 53/04* | (2006.01) |
| *B01D 53/86* | (2006.01) |
| *H01M 8/04537* | (2016.01) |
| *H01M 8/04791* | (2016.01) |
| *H01M 8/04302* | (2016.01) |
| *H01M 8/04303* | (2016.01) |
| *H01M 8/04228* | (2016.01) |
| *H01M 8/04225* | (2016.01) |
| *H01M 8/04223* | (2016.01) |
| *H01M 8/04082* | (2016.01) |
| *H01M 8/0444* | (2016.01) |

(52) U.S. Cl.
CPC ... *H01M 8/04097* (2013.01); *H01M 8/04611* (2013.01); *H01M 8/04753* (2013.01); *H01M 8/04888* (2013.01); *B01D 2253/1122* (2013.01); *B01D 2257/104* (2013.01); *B01D 2259/40083* (2013.01); *B01D 2259/818* (2013.01); *H01M 8/0447* (2013.01); *H01M 8/04216* (2013.01); *H01M 8/04225* (2016.02); *H01M 8/04228* (2016.02); *H01M 8/04231* (2013.01); *H01M 8/04302* (2016.02); *H01M 8/04303* (2016.02); *H01M 8/04619* (2013.01); *H01M 8/04798* (2013.01); *H01M 8/04805* (2013.01); *H01M 8/0687* (2013.01); *H01M 2250/20* (2013.01)

(58) Field of Classification Search
CPC ............ B01D 53/0407; B01D 53/8671; B01D 2259/40083; B01D 2259/818; B01D 2253/1122; B01D 2257/104
See application file for complete search history.

Fig. 1 "PRIOR ART"
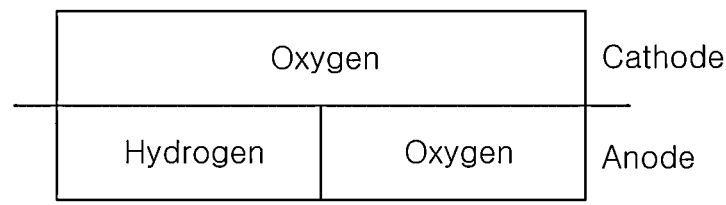
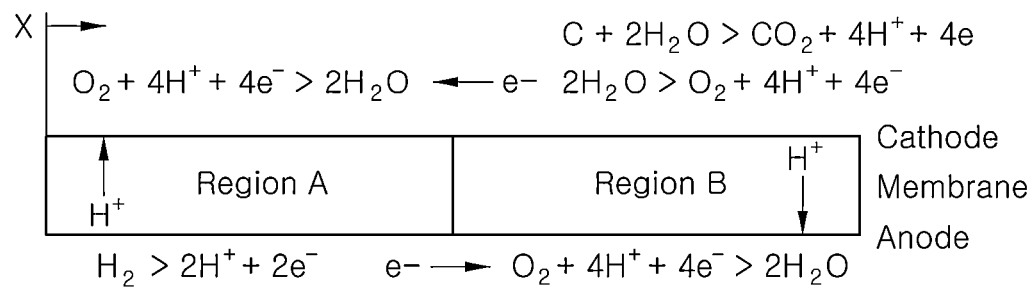
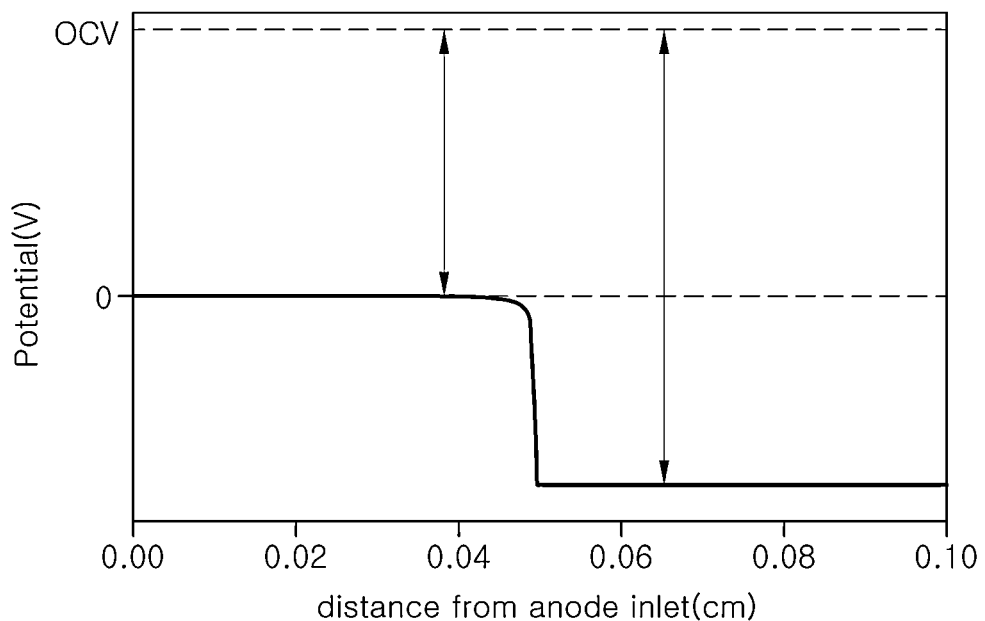

AIR SUPPLY SYSTEM FOR FUEL CELL AND METHOD OF CONTROLLING SAME

CROSS REFERENCE TO RELATED APPLICATIONS

This application is a divisional application of non-provisional U.S. patent application Ser. No. 17/029,344, filed on Sep. 23, 2020, which claims priority to and the benefit of Korean Patent Application No. 10-2020-0059860, filed May 19, 2020, the entire contents of each of which are incorporated herein by reference.

FIELD

The present disclosure relates to an air supply system for a fuel cell and a method of controlling the same system.

BACKGROUND

The statements in this section merely provide background information related to the present disclosure and may not constitute prior art.

A fuel cell is a kind of generator that directly converts the chemical energy resulting from oxidation of fuel into electric energy. A fuel cell is basically the same as a chemical cell in that it uses oxidation and reduction reactions, but the fuel cell differs from the chemical cell, which is a closed reaction system, in that reactants are continuously supplied and a reaction product is continuously removed. In recent years, fuel cells have been put into practical use, and research for use of such a fuel cell as an energy source for eco-friendly vehicles has been actively conducted because the reaction product of a fuel cell is pure water.

A fuel cell includes a fuel cell stack that generates electrical energy through chemical reactions, an air supply device that supplies air to the air electrode of the fuel cell stack, and a hydrogen supply device that supplies hydrogen to the hydrogen electrode of the fuel cell stack.

That is, air containing oxygen is supplied to the air electrode (cathode) of the fuel cell stack, and hydrogen is supplied to the hydrogen electrode (anode) of the fuel cell stack.

When operation of the fuel cell stack is stopped, the supply of air to the fuel cell stack is stopped. In this state, hydrogen remaining in a hydrogen supply line is introduced into the air electrode due to the cross-over phenomenon, and the introduced hydrogen and the remaining oxygen react on the air electrode. Due to this reaction, a negative pressure is generated in the fuel cell stack, resulting in a problem in which external air is introduced into the fuel cell stack.

FIG. 1 is a diagram illustrating a potential curve when oxygen is introduced into a hydrogen electrode in the related art, and FIG. 2 is a graph illustrating I-V performance curves respectively for a case where an electrode is corroded and a case where an electrode is not corroded.

Referring to FIGS. 1 and 2, when the power generation operation of the fuel cell system is stopped, the supply of air to the fuel cell stack needs to be blocked. However, it is difficult to perfectly block the air from being introduced into the fuel cell stack.

The air introduced into the air electrode of the fuel cell stack crosses over to the hydrogen electrode. In this case, oxygen in the air is the main cause of corrosion of the electrodes of the fuel cell stack.

We have discovered that when the power generation operation of the fuel cell stack is resumed after being temporarily stopped, and when hydrogen is supplied to the hydrogen electrode, a hydrogen/oxygen interface is formed between a region A and a region B, resulting in a high potential area. Due to the presence of this high potential area, corrosion easily occurs on the electrodes of the fuel cell stack.

When an electrode in a fuel cell stack is corroded, as can be seen from FIG. 2, each unit cell in the fuel cell stack provides a reduced voltage for the same current. That is, the power generation performance of the fuel cell stack is deteriorated.

The foregoing is intended merely to aid in the understanding of the background of the present disclosure, and is not intended to mean that the present disclosure falls within the purview of the related art that is already known to those skilled in the art.

SUMMARY

The present disclosure provides an air supply system for a fuel cell, which is capable of inhibiting or preventing introduction of oxygen into a fuel cell stack when a power generation operation of the fuel cell stack is stopped.

In one form of the present disclosure, an air supply system for a fuel cell may include: a fuel cell stack in which multiple unit cells are stacked on one another and that generates electrical energy through chemical reactions; an air channel configured to supply incoming air containing oxygen to an inlet of the fuel cell stack and to transfer air discharged from an outlet of the fuel cell stack to the outside of the air supply system; and a gas adsorption unit disposed on the air channel, positioned near the outlet of the fuel cell stack, and configured to adsorb oxygen contained in air introduced into the air channel.

The gas adsorption unit may include a pack of diatomite powder containing metal and catalyst such that oxygen in air flowing through the air channel is adsorbed in the gas adsorption unit.

The system may further include: a voltage source that applies a voltage to the gas adsorption unit to cause the oxygen adsorbed in the gas adsorption unit to react with fuel; and a power supply controller that controls the voltage sourced to apply or not to apply a voltage to the gas adsorption unit depending on an operating state of the fuel cell stack.

The voltage source may be part of the multiple unit cells included in the fuel cell stack.

The system may further include a switch disposed between the voltage source and the gas adsorption unit. The power supply controller may control the switch to be turned on such that a voltage can be applied to the gas adsorption unit via the switch when the power generation operation of the fuel cell stack is resumed.

The system may further include: a fuel return channel that returns fuel discharged from the outlet of the fuel cell stack to the inlet of the fuel cell stack; a purge channel connecting the fuel return channel and the air channel, wherein the purge channel is connected to the fuel return channel at a position near the outlet of the fuel cells tack; a purge valve disposed on the purge channel and configured to adjust a flow rate of fuel flowing through the purge channel when fuel in the fuel return channel is evacuated into the air channel through the purge channel; and a purge controller that controls the purge value to open when the power generation operation of the fuel cell stack is resumed.

In another form, the system may further include: a fuel return channel that returns fuel discharged from the outlet of the fuel cell stack to the inlet of the fuel cell stack; a purge channel connecting the fuel return channel and the air channel, wherein the purge channel is connected to the fuel return channel at a position near the outlet of the fuel cell stack; and a purge valve disposed on the purge channel and configured to adjust a flow rate of fuel flowing through the purge channel when fuel in the fuel return channel is evacuated into the air channel through the purge channel, in which the power supply controller may control the voltage source to apply a voltage to the gas adsorption unit when the purge valve is controlled to open.

The system may further include a shutoff valve disposed on the air channel, positioned near the outlet of the fuel cell stack, positioned downstream of the gas adsorption unit, and configured to block air flow through the air channel when the power generation operation of the fuel cell stack is stopped.

In another form of the present disclosure, a method of controlling an air supply system for a fuel cell includes: determining whether a power generation operation of a fuel cell stack is resumed; controlling a voltage source to apply a voltage to a gas adsorption unit when it is determined that the power generation operation of the fuel cell stack is resumed; and supplying air to an air channel connected to the fuel cell stack in a state in which the voltage is applied to the gas adsorption unit.

The method may further include: after supplying the air to the fuel cell stack, purging the fuel return channel by evacuating fuel in a fuel return channel into the air channel, the fuel return channel being configured to return fuel discharged from an outlet of the fuel cell stack to an inlet of the fuel cell stack.

The method may further include: after purging the fuel return channel, stopping application of a voltage to the gas adsorption unit from the voltage source.

The method may further include: before determining whether the power generation operation of the fuel cell stack is resumed, determining whether the power generation operation of the fuel cell stack is stopped; and when the power generation operation of the fuel cell stack is stopped, stopping application of a voltage to the gas adsorption unit from the voltage source.

In the controlling of the voltage source to apply a voltage to the gas adsorption unit, part of multiple unit cells included in the fuel cell stack may be connected to the gas adsorption unit.

The system and method of the present disclosure can block oxygen from being introduced into the fuel cell stack when the power generation operation of the fuel cell stack is stopped. Thus, the system and method can prevent corrosion of the electrode of the fuel cell at the time of resuming the power generation operation of the fuel cell stack, thereby improving durability of the fuel cell stack.

In addition, the system and method of the present disclosure are configured to enable hydrogen evacuated from the fuel return channel to react with oxygen when the power generation operation of the fuel cell stack is resumed. Therefore, at the time of resuming the power generation operation of the fuel cell stack, it is possible to reduce the concentration of hydrogen in the air discharged to the outside.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a diagram illustrating a potential curve when oxygen is introduced into a fuel electrode in the related art;

Figure 2:
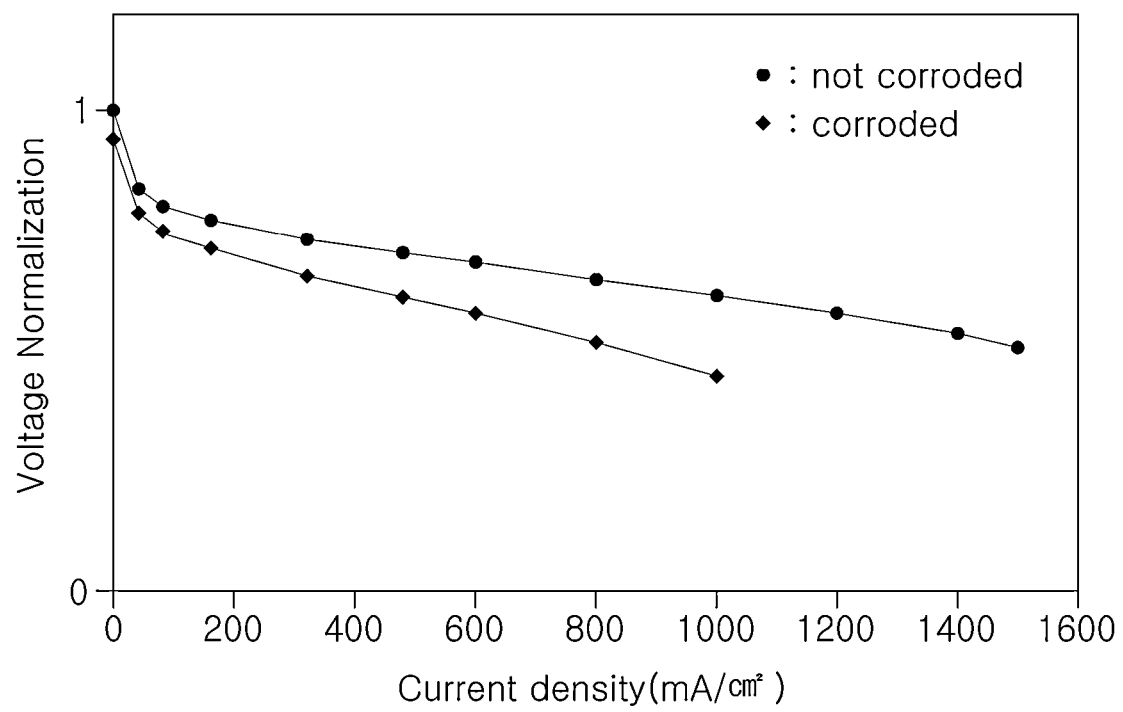
FIG. 2 is a graph illustrating I-V performance curves respectively for a case where an electrode is corroded and a case where an electrode is not corroded.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Specific structural or functional descriptions of forms of the present disclosure are provided only for illustrative purposes. The present disclosure can be embodied in various forms and it should not be construed that forms of the present disclosure are limited only to the forms described in the present disclosure.

There can be various forms in accordance with the concept of the present disclosure, and only some forms will be illustrated in the drawings and described in detail in the description below. Thus, the present disclosure should be construed to cover not only the specific forms but also cover all modifications, equivalents, and substitutions that fall within the concept and technical spirit of the present disclosure.

Terms used in the specification, "first", "second", etc. can be used to discriminate one element from another element, but the order or priority of the elements are not limited by the terms unless specifically stated. Accordingly, a first element in one form may be referred to as a second element in another form, and similarly, a second element in one form may be referred to as a first element in another form, only for the purpose of discrimination of one element from another element, without departing from the scope of the present disclosure.

It will be understood that when any element is referred to as being "connected" or "coupled" to another element, one element may be directly connected or coupled to the other element, or an intervening element may be present therebetween. In contrast, it should be understood that when an element is referred to as being "directly coupled" or "directly connected" to another element, there are no intervening elements present between them. Other expressions describing relationships between elements, for example, "between", "directly between" "adjacent to", "directly adjacent" should be interpreted in the same manner.

The terminology used herein is for the purpose of describing particular forms only and is not intended to be limiting. As used herein, the singular forms "a", "an", and "the" are intended to include the plural forms as well unless the context clearly indicates otherwise. It will be further understood that the terms "comprises", "includes", or "has" when used in the present disclosure specify the presence of stated features, regions, integers, steps, operations, elements and/or components, but do not preclude the presence or addition of one or more other features, regions, integers, steps, operations, elements, components and/or combinations thereof.

In addition, unless otherwise defined, all terms including technical and scientific terms used herein have the same meaning as commonly understood by those who are ordinarily skilled in the art to which this present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary forms of the present disclosure will be described the accompanying drawings. Through the drawings, like reference symbols denote like elements.

Figure 3:
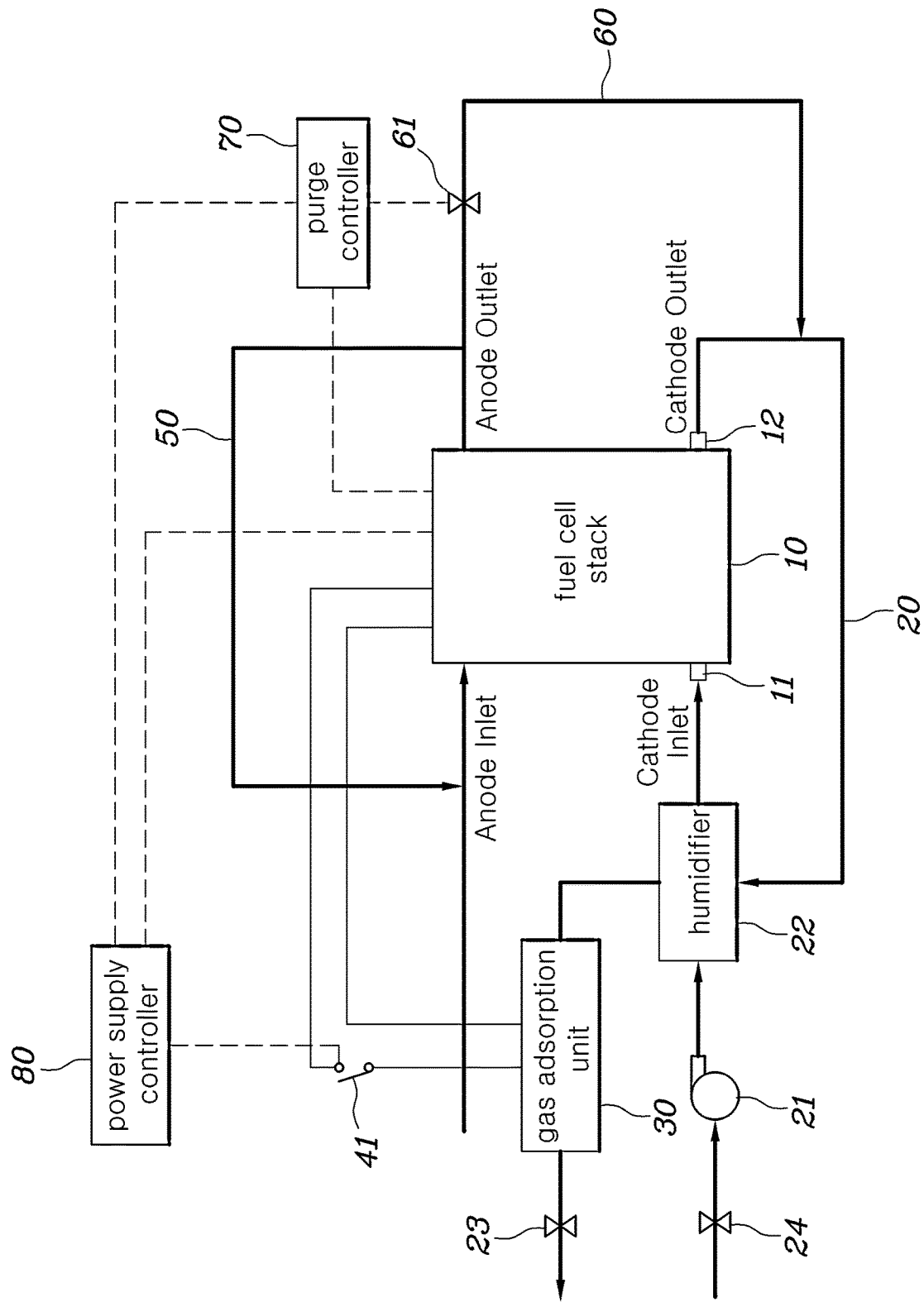
FIG. 3 is a schematic diagram illustrating the construction of a fuel cell air supply system in one form of the present disclosure.
Figure 4:
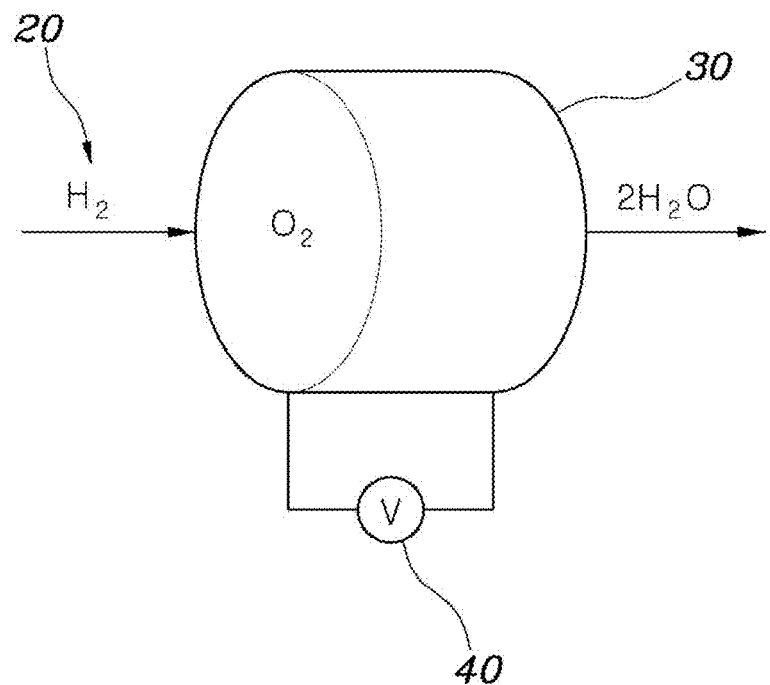
FIG. 4 is a diagram illustrating the overall construction of a gas adsorption unit used in one form of the present disclosure.

FIG. 3 is a schematic diagram illustrating the construction of a fuel cell air supply system in one form of the present disclosure, and FIG. 4 is a schematic diagram illustrating the construction of a gas adsorption unit used in one form of the present disclosure.

Referring to FIGS. 3 and 4, the fuel cell air supply system includes: a fuel cell stack 10 including multiple unit cells which are stacked on one another and generating electrical energy through chemical reactions; an air channel 20 configured to supply air containing oxygen to an inlet 11 of the fuel cell stack and to transfer air discharged from an outlet 12 of the fuel cell stack 10 to the outside; and a gas adsorption unit 30 disposed on the air channel 20, positioned near the outlet 12 of the fuel cell stack 10, and configured to adsorb oxygen in the air introduced into the air channel 20.

The fuel cell stack 10 receives hydrogen serving as fuel and air containing oxygen and generates electrical energy through chemical reactions on an anode (also referred to as hydrogen electrode or fuel electrode) and a cathode (also referred to as oxygen electrode or air electrode). In the fuel cell stack 10, hydrogen and oxygen react to each other, thereby generating water as byproduct.

The fuel cell stack 10 is a stack of multiple unit cells. Fuel (hydrogen) and air (oxygen) are introduced into each of the unit cells for generation of electricity. The unit cells are connected in series so that the fuel cell stack 10 can output a rating voltage.

The air channel 20 is used to supply external air to the fuel cell stack 10 and evacuate used air discharged from the fuel cell stack 10 to the outside. A blower or a compressor 21 is positioned at an input port of the air channel 20.

When the fuel cell stack 10 generates electrical energy, the blower or compressor 21 is operated so that air can be introduced into the fuel cell stack 10 through the air channel 20 and then the used air is discharged from the fuel cell stack 10 to the outside through the air channel 20.

However, when the power generation operation of the fuel cell stack 10 is stopped, introduction of air into the air channel 20 is stopped. At this time, the back flow of air into the fuel cell stack 10 through the outlet 12 occurs.

A humidifier 22 for humidifying the air to be introduced into the fuel cell stack 10 is positioned near the input port of the air channel 20. The humidifier 22 is connected to an output port of the air channel 20 connected to the outlet 12 of the fuel cell stack 10. The humidifier 22 may function to transfer moisture contained in the air discharged from the output port of the air channel 20 to the inlet 11 of the fuel cell stack 10.

The gas adsorption unit 30 is disposed at a near-outlet portion of the air channel 20. That is, the gas adsorption unit 30 is disposed on the air channel 20 and positioned near the outlet 12 of the fuel cell stack 10.

In the state where the power generation operation of the fuel cell stack 10 is not performed, the gas adsorption unit 30 adsorbs and removes oxygen contained in the air discharged from the output port of the air channel 20.

Therefore, introduction of oxygen into the fuel cell stack 10 is inhibited or prevented when the power generation operation of the fuel cell stack 10 is stopped, and the durability of the fuel cell stack 10 can be improved because corrosion of electrodes is prevented when the power generation operation of the fuel cell stack 10 is resumed.

In one form, the gas adsorption unit 30 includes a pack of diatomite powder in which metal and catalyst are contained. The gas adsorption unit 30 adsorbs oxygen contained in the air flowing through the air channel 20.

The diatomite powder may contain iron powder, pro-oxidant (catalyst) particles, and fillers. The gas adsorption unit 30 is made of diatomite nano-particles that are coated. The gas adsorption unit 30 adsorbs oxygen contained in the air flowing through the air channel 20.

When a voltage is applied to the gas adsorption unit 30, hydrogen and oxygen react to each other to generate water. Hydrogen in the air flowing through the air channel 20 reacts with the oxygen adsorbed on the gas adsorption unit 30. Therefore, the amount of hydrogen discharged through the air channel 20 can be reduced.

The air supply system further includes: a voltage source 40 that applies a voltage to the gas adsorption unit 30 so that oxygen adsorbed on the gas adsorption unit 30 can react with fuel (i.e., hydrogen); and a power supply controller 80 that controls application of a voltage to the gas adsorption unit 30 from the voltage source on the basis of an operating state of the fuel cell stack 10.

In another form, the power supply controller 80 controls the voltage source 40 to apply a voltage to the gas adsorption unit 30 when the power generation operation of the fuel cell stack 10 is resumed. Accordingly, oxygen adsorbed in the gas adsorption unit 30 reacts with hydrogen that is evacuated into the air channel 20 from the fuel return channel, thereby removing the hydrogen from air to be discharged to the outside.

In some forms, when the power generation operation of the fuel cell stack 10 is stopped, the power supply controller 80 controls the voltage source 40 not to apply a voltage to the gas adsorption unit 30. Therefore, oxygen can be adsorbed in the gas adsorption unit 30.

In some forms, the application of the voltage to the gas adsorption unit 30 from the voltage source 40 can be stopped while the power generation operation of the fuel cell stack continues. In the case where the power generation operation of the fuel cell stack is stopped, the voltage source 40 is controlled to apply a voltage to the gas adsorption unit 30 for a predetermined period of time so that the oxygen adsorbed in the gas adsorption device 30 can be removed.

The voltage source 40 may be implemented with part of the multiple unit cells included in the fuel cell stack 10. That is, the voltage source 40 can be implemented with a discrete device such as a separate battery or with part of the multiple unit cells included in the fuel cell stack 10.

The air supply system further includes a switch 41 disposed between the voltage source 40 and the gas adsorption unit 30. The power supply controller 80 controls the switch 41 to be turned on so that a voltage can be applied to the gas adsorption unit 30 through the switch when the power generation operation of the fuel cell stack 10 is stopped and then resumed.

The power supply controller 80 can control the switch 41 to be turned on such that the voltage source 40 and the gas adsorption unit 30 are connected to each other or to be turned off such that the voltage source 40 and the gas adsorption unit 30 are disconnected from each other.

The air supply system further includes: a fuel return channel 50 through which fuel discharged from the outlet of the fuel cell stack 10 returns to the inlet of the fuel cell stack 10;

In another form, the system may further include a purge valve 61 disposed on a purge channel 60 connecting the fuel return channel 50 and the air channel 20. In some forms, the purge channel 60 is connected to the fuel return channel 50 at a position near the outlet of the fuel cell stack 10, and the purge valve 61 controls a flow rate of fuel evacuated into the air channel 20 from the fuel return channel 50 through the purge channel 60. In one form, the system may further include a purge controller 70 that controls the purge valve to open when the power generation operation of the fuel return channel 50 is stopped and then resumed.

The fuel return channel 50 is a flow path along which hydrogen mixed with impurities such as moisture and nitrogen flows. The fuel return channel 50 is periodically purged such that hydrogen with impurities in the fuel return channel 50 can be periodically removed.

The purge controller 70 controls the purge valve to open or close. In this manner, the fuel return channel 50 can be purged. The purge controller 70 estimates the concentration of hydrogen in the air inside the fuel return channel 50 and controls the purge valve to open so that the fuel return channel 50 can be purged when the estimated concentration of hydrogen is lower than a predetermined lower limit value.

During a period in which the power generation operation of the fuel cell stack 10 is stopped, hydrogen is not supplied to the fuel electrode. In this state, a cross-over phenomenon occurs between the fuel electrode and the air electrode, and thus the concentration of impurities increases.

For this reason, when the power generation operation of the fuel cell stack 10 is stopped and then resumed, the purge controller 70 controls the purge value to open so that the fuel return channel 50 can be purged.

The power supply controller 80 controls the voltage source 40 to apply a voltage to the gas adsorption unit 30 when the purge value is controlled to open.

The purge controller 70 controls the purge valve to open so that the fuel return channel 50 can be purged not only when the power generation operation of the fuel cell stack 10 is stopped and then resumed but also when the power generation operation of the fuel cell stack 10 continues.

When the purge controller 70 controls the purge value to open, the power supply controller 80 controls the voltage source 40 to apply a voltage to the gas adsorption unit 30 so that the hydrogen evacuated from the fuel return channel 50 into the air channel 20 can react with the oxygen adsorbed on the gas adsorption unit 30.

The system may further include shutoff valves 23 and 24 disposed on the air channel 20, positioned downstream of the gas adsorption unit 30, and configured to block air flow through the air channel 20 when the power generation operation of the fuel cell stack 10 is stopped.

In one form, the shutoff valves 23 and 24 are disposed on the air channel 20 and positioned near the outlet 12 of the fuel cell stack 10. The shutoff valves 23 and 24 block air flow through the air channel during a period in which the power generation operation of the fuel cell stack 10 is stopped.

However, even in a state in which the shutoff valves 23 and 24 are closed, if the state in which the power generation operation of the fuel cell stack 10 is stopped continues for a long period of time, air may be introduced into the air channel 20. The gas adsorption unit 30 disposed on the air channel 20 is positioned near the outlet 12 of the fuel cell stack 10 and positioned downstream of the shutoff valves 23 and 24.

In addition, other shutoff valves 23 and 24 may be disposed on the air channel 20 and positioned near the inlet 11 of the fuel cell stack 10.

In one form of the present disclosure, the purge controller 70 and the power supply controller 80 may be implemented with: a non-volatile memory (not shown) configured to store data associated with an algorithm that controls operation of various components of a vehicle or associated with software instructions to execute the algorithm; and a processor (not shown) configured to perform the operations described below using the data stored in the non-volatile memory. The memory and processor may be implemented with discrete chips, respectively. The memory and processor may be implemented with an integrated chip. The processor may be implemented with an array of processors.

Figure 5:
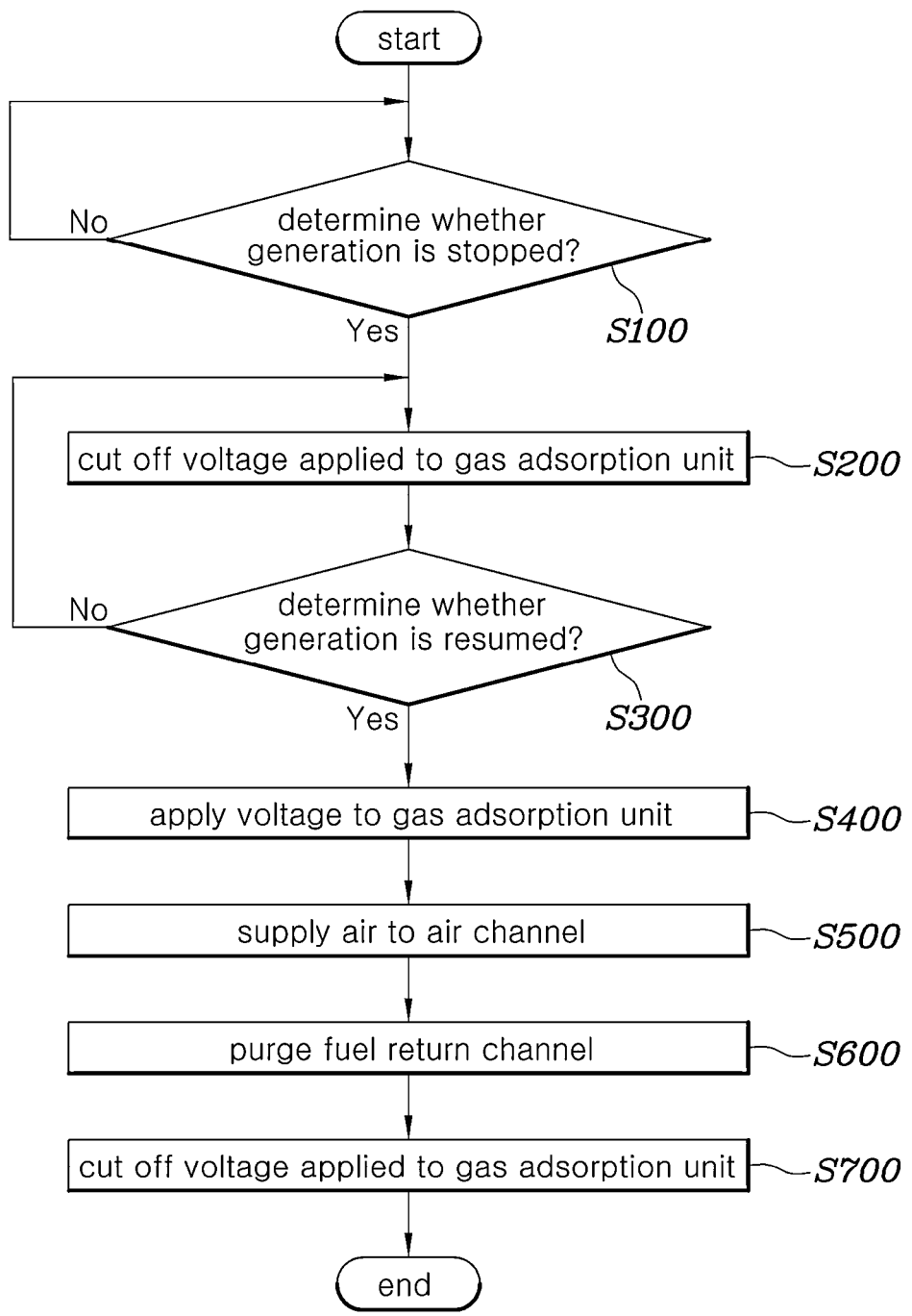
FIG. 5 is a flowchart illustrating a method of controlling such a fuel cell air supply system in one form of the present disclosure.

FIG. 5 is a flowchart illustrating a method of controlling such a fuel cell air supply system in one form of the present disclosure.

Referring to FIG. 5, the method of controlling a fuel cell air supply system includes: step S300 of determining whether a power generation operation of a fuel cell stack 10 is resumed; step S400 of applying a voltage to a gas adsorption unit 30 when it is determined that the power generation operation of the fuel cell stack 10 is resumed; and step S500 of supplying air to an air channel 20 connected to the fuel cell stack 10 in a state in which a voltage is applied to the gas adsorption unit 30.

Before step S300, the method may further include step S100 of determining whether the power generation operation of the fuel cell stack 10 is stopped and step S200 of stopping application of the voltage to the gas adsorption unit 30 when it is determined that the power generation operation of the fuel cell stack 10 is stopped.

When it is determined that the power generation operation of the fuel cell stack 10 is stopped, a switch 41 is turned off so that a voltage cannot be applied to the gas adsorption unit 30, and in this case, oxygen contained in air flowing through the air channel 20 can be adsorbed on the gas adsorption unit 30.

When the power generation operation of the fuel cell stack 10 is resumed after being stopped, the voltage may be applied to the gas adsorption unit 30 from the voltage source 40.

In step S500 in which air is supplied to the air channel 20, a voltage is continuously applied to the gas adsorption unit 30 so that the oxygen adsorbed on the gas adsorption unit 30 can be removed.

After step S500 in which air is supplied, the method may further include step S600 of purging a fuel return channel 50 through which fuel discharged from the outlet of the fuel cell stack 10 returns to the inlet of the fuel cell stack 10 so that the fuel in the fuel return channel 50 is evacuated into the air channel 20.

While air is supplied to the air channel 20, the fuel in the fuel return channel 50 is evacuated into the air channel 20. Thus, the fuel in the fuel return channel 50 is diluted with air before being discharged to the outside.

In step S500 in which air is supplied, since the gas adsorption unit 30 is in a state of being applied with a voltage, the fuel (hydrogen) that is evacuated reacts with the oxygen adsorbed on the gas adsorption unit 30. Thus, the concentration of hydrogen is reduced before the air is discharged to the outside.

After step S600 in which fuel is evacuated into the air channel 20, when the fuel is completely evacuated from the fuel return channel, the method may further include step S700 of stopping application of the voltage to the gas adsorption unit 30 from the voltage source 40.

That is, when the purging is completed and thus no hydrogen is present in the air channel 20, the switch 41 is turned off so that the application of the voltage to the gas adsorption unit 30 from the voltage source 40 can be stopped. With this process, it is possible to reduce power consumption.

In addition, when it is desired to stop the power generation operation of the fuel cell stack 10, the switch 41 is turned on so that the application of the voltage to the gas adsorption unit 30 from the voltage source 40 is started again. In this manner, it is possible to remove oxygen adsorbed on the gas adsorption unit 30 before stopping the power generation operation of the fuel cell stack 10.

In step S400 in which a voltage is applied to the gas adsorption unit 30 from the voltage source 40, part of multiple unit cells included in the fuel cell stack 10 is (or are) connected to the gas adsorption unit 30. In this case, electrical energy generated by the fuel cell stack 10 is used to apply a voltage to the gas adsorption unit rather than using an additional power supply.

Figure 6:
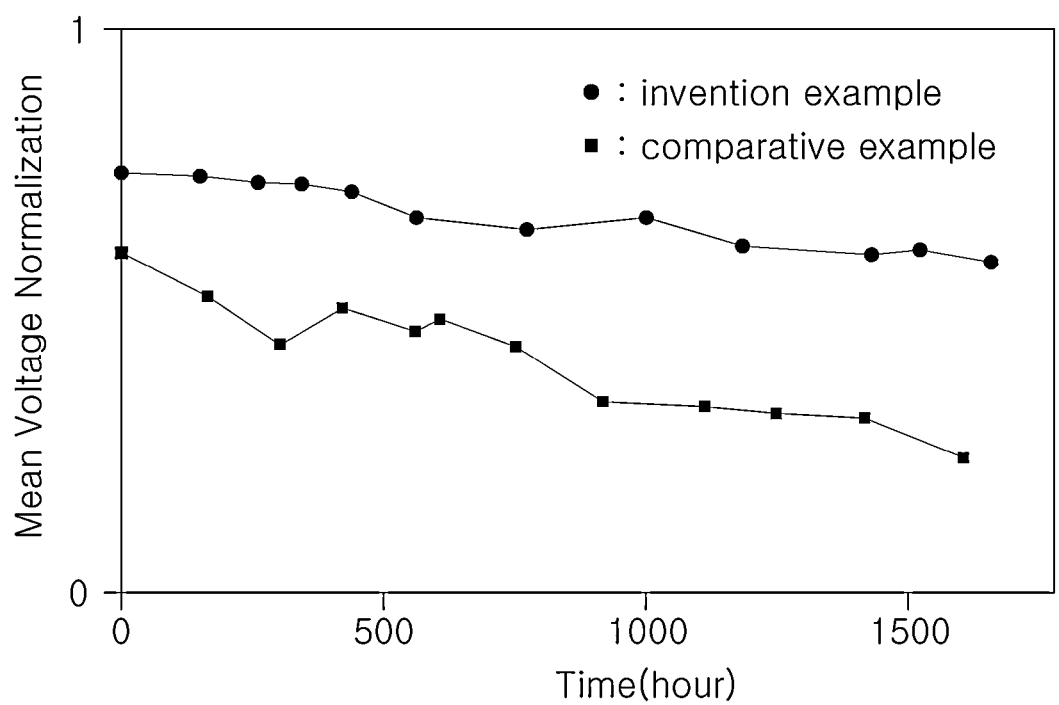
FIG. 6 is a graph illustrating a difference in performance between a fuel cell to which the fuel cell air supply system in one form of the present disclosure is applied and a typical fuel cell of a comparative example.

FIG. 6 is a graph illustrating a performance difference between a fuel cell to which the fuel cell air supply system in one form of the present disclosure is applied, and a typical fuel cell of a comparative example.

In the graph, each curve shows the average voltage of each unit cell of the multiple unit cells in a corresponding fuel cell when it is assumed that each of the fuel cells provides the same current.

Referring to FIG. 6, in the case where the fuel cell air supply system in one form of the present disclosure is used to inhibit or prevent corrosion of an electrode of the fuel cell, a performance deterioration of the fuel cell of the present disclosure is slower than that of the typical fuel cell of the comparative example.

Although only exemplary forms have been described, those skilled in the art will appreciate that various modifications and changes thereto are possible without departing from the scope and spirit of the present disclosure.

What is claimed is:

1. A method of controlling an air supply system for a fuel cell, where the air supply system includes a fuel cell stack, an air channel to supply air to an inlet of the fuel cell stack, a gas adsorption unit disposed on the air channel and configured to adsorb oxygen contained in air introduced into the air channel, the method comprising:
  determining whether a power generation operation of the fuel cell stack is resumed;
  when the power generation operation of the fuel cell stack is resumed, controlling a voltage source to apply a voltage to the gas adsorption unit; and
  supplying air to the fuel cell stack through the air channel in a state in which the voltage is applied to the gas adsorption unit.

2. The method according to claim 1, further comprising: after supplying the air to the fuel cell stack, purging a fuel return channel by evacuating fuel in the fuel return channel into the air channel, wherein fuel discharged from an outlet of the fuel cell stack is returned to the inlet of the fuel cell stack through the fuel return channel.

3. The method according to claim 2, further comprising: after purging the fuel return channel, stopping application of the voltage to the gas adsorption unit from the voltage source.

4. The method according to claim 1, further comprising:
  before determining whether the power generation operation of the fuel cell stack is resumed, determining whether the power generation operation of the fuel cell stack is stopped; and
  when the power generation operation of the fuel cell stack is stopped, blocking the voltage from being applied to the gas adsorption unit.

5. The method according to claim 1, wherein in controlling the voltage source to apply a voltage to the gas adsorption unit, connecting a part of multiple unit cells included in the fuel cell stack to the gas adsorption unit.

* * * * *